Nov. 20, 1928.

A. L. McKINNON 1,692,752

TIRE CHAIN FASTENER

Filed Dec. 12, 1927

Inventor
ARCHIBALD LACHLAN McKINNON his Attorneys

Patented Nov. 20, 1928.

1,692,752

UNITED STATES PATENT OFFICE.

ARCHIBALD LACHLAN McKINNON, OF ST. CATHARINES, ONTARIO, CANADA, ASSIGNOR TO THE COLUMBUS-McKINNON CHAIN COMPANY, OF TONAWANDA, NEW YORK, A CORPORATION OF OHIO.

TIRE-CHAIN FASTENER.

Application filed December 12, 1927. Serial No. 239,430

The object of this invention is to provide a tire chain fastener of simple and economical construction whereby the side chains of an anti-skid chain can be connected with more assurance than heretofore that they will remain fastened and yet be easily separated when desired.

The invention is embodied in the example herein shown and described.

In the accompanying drawing—

In the views 5 designates the tire, 6 the side chain and 7 the cross chains.

Figure 1:
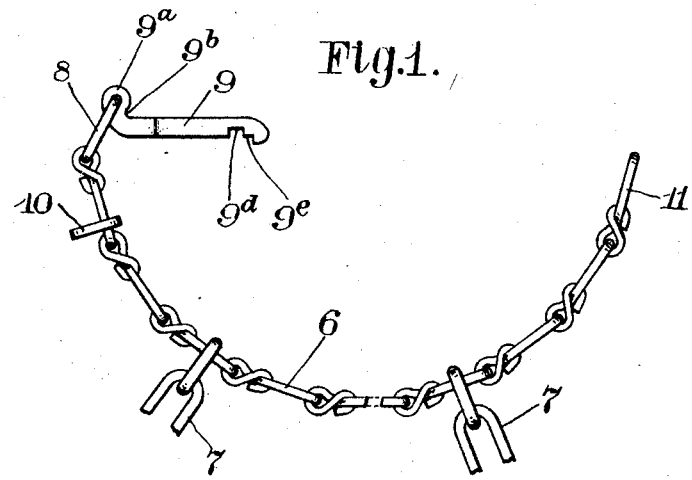
Figure 1 is a side view showing the ends of a side chain according to the invention unconnected.
Figure 2:
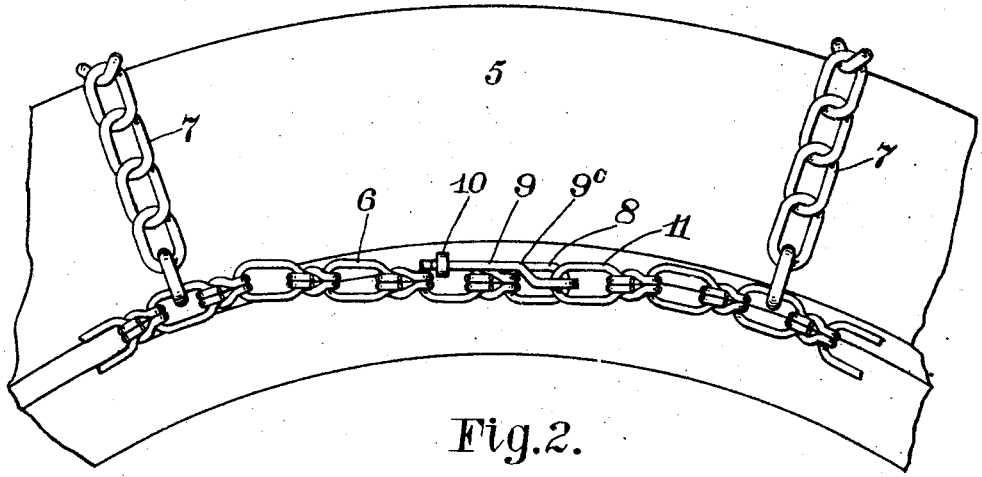
Fig. 2 shows the side chain connected.
Figure 3:
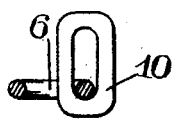
Fig. 3 is a section, on a larger scale, illustrating the loop to receive the hook.

One end of the side chain has attached to it a link 8 to which is connected the hook 9 of the present invention. Said hook 9 is formed of flat metal and has its pivoted end curved and provided with an eye $9^a$ for connection with the link 8 and a seat $9^b$ for the end link of the opposite end of the side chain. The bar of the hook 9 is provided with a transverse bend $9^c$ and its free end with a rectangular seat or recess $9^d$ and beyond that, and elevated from it, a second angular recess $9^e$, the point of the hook being somewhat offset from the line of the edge of the hook. This makes a rather close fit of the hook as respects the opening in the keeper link 10 for the swinging of the said keeper link onto the hook and therefore renders the hook less likely to escape from the link. The end of the side chain containing the said hook 9 is provided with a keeper link 10, the stock or bar of which is rectangular in cross section, said keeper link to be drawn onto the end of the hook 9 and normally engaged with the recess $9^d$ after the hook 9 has been passed through the terminal link 11 of the opposite end of the side chain, as shown in Fig. 2. When in place on the wheel the link 11 is engaged with the seat $9^b$ at the base of the hook 9. Because the stock of the link 10 is rectangular and its primary and supplemental seats $9^d$ and $9^e$ are angular the likelihood of accidental release of the hook is minimized. The bend $9^c$ permits the hook to lie snugly as respects the two ends of the chain where connected, and the draft of link 11 on the seat $9^b$ tends to keep seat $9^d$ or $9^e$ engaged with the link 10.

The forms of the parts can be changed without departing from the gist of the invention as claimed.

What I claim is:

1. A fastener for a side chain of an anti-skid chain including a hook connected with one end of the side chain and a keeper therefor, said hook having its free end formed with two recesses, one beyond the other to be engaged by said keeper.

2. A fastener for a side chain of an anti-skid chain including a hook connected with one end of the side chain, said hook having its free end formed with an angular recess, and a keeper for the hook, the bar of which is angular in cross section to engage the recess of said hook.

3. A fastener for a side chain of an anti-skid chain including a hook connected with one end of the side chain, said hook having its free end formed with two angular recesses and a keeper for said hook, the bar of which is angular in cross section to engage one of said recesses.

4. A fastener for a side chain of an anti-skid chain including a hook connected with one end of the side chain, said hook having its free end formed with two angular recesses, one elevated above the other, and a keeper for said hook, the bar of which is angular in cross section to engage a recess of said hook.

ARCHIBALD LACHLAN McKINNON.